Figure 1:
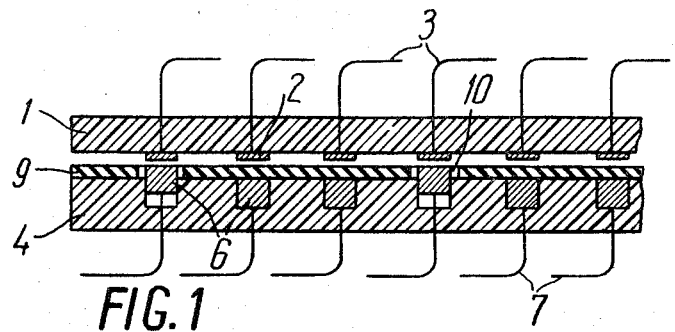

United States Patent [19]
Tarnopolsky et al.

[11] 3,760,512
[45] Sept. 25, 1973

[54] ENCODER FOR A TEACHING MACHINE

[76] Inventors: Igor Rafailovich Tarnopolsky, ulitsa Zavodskaya, 33, kv. 27; Gennady Vasilievich Akimtsev, ulitsa Furmanova, 23, both of Frunze, U.S.S.R.

[22] Filed: Sept. 22, 1971

[21] Appl. No.: 182,655

[52] U.S. Cl. .................. 35/48 R, 35/4, 35/19 A
[51] Int. Cl. ............................................. G09b
[58] Field of Search ............... 35/48 R, 48 A, 9 R, 35/9 C, 4, 19 A

[56] References Cited
UNITED STATES PATENTS

| | | | |
|---|---|---|---|
| 3,106,027 | 10/1963 | Thelen | 35/9 C |
| 2,889,634 | 6/1959 | Bringmann | 35/9 C |
| 3,057,082 | 10/1962 | Wellington et al. | 35/9 C |
| 3,650,044 | 3/1972 | Burdick | 35/9 C |

*Primary Examiner*—Robert W. Michell
*Assistant Examiner*—J. H. Wolff
*Attorney*—Holman & Stern

[57] ABSTRACT

An encoder for a teaching machine comprising: a contact-bearing board connected to the graphic answer input device of the teaching machine, and an encoder board with contacts arranged coaxially with respect to the contacts of the contact-bearing board, the encoder board being made as a plate of an insulation material while the contacts of said boards being separated by an expendable punched card serving as a programme carrier. According to the invention the encoder board is provided with sockets in which its contacts are housed, the contacts being spring-loaded and able to shift in the vertical direction.

1 Claim, 3 Drawing Figures

ENCODER FOR A TEACHING MACHINE

This invention generally relates to electrical encoding devices and, in particular, to an encoding device wherein electrical interconnection between a plurality of leads is selected under the control of a program carrier such as a punched card. The invention has utility in computer technology machines for programmed instruction encoders for machines used for draftsmanship training. It can also be widely used as an encoder in programmed process control systems in machine building, instrument making and similar industries.

Known in the art is an encoder comprising a contact bearing board whose contacts are connected to a graphic answer input unit; an encoder board whose contacts are connected to a logical unit of the computer, and an expendable punched card serving as a program carrier, which card is placed between the two boards.

This encoder is programmed, i.e., the interconnection of various electrical leads thereto and therefrom is selected by means of manually changing the positions of contact leads on the contact-bearing board itself.

A major drawback of the known device consists in that the rearrangement of contact leads on the contact-bearing board in order to reprogramme the encoder has to be carried out manually, which is quite inefficient.

The present invention obviates the above drawback.

The object of the invention is to ensure quick replacement or changing of the program code, i.e., the selective interconnection of the contact leads.

This object is achieved by means of designing an encoder device useful with a teaching machine, for example, which comprises: a contact-bearing board, whose contacts or leads are electrically connected to some external apparatus such as a graphic answer input device of the teaching machine, and an encoder board made as a plate of insulation material and provided with further contacts or leads arranged coaxially with the contacts of the contact-bearing board, the respective sets of contacts of said boards being separated and insulated from one another by an expendable punched card serving as a programme carrier. The encoder board is provided with sockets housing its contacts, the contacts being spring-loaded and therefore can shift in the vertical direction through selective holes provided in the card to make selective connection with contacts of the contact bearing board.

Figure 2:
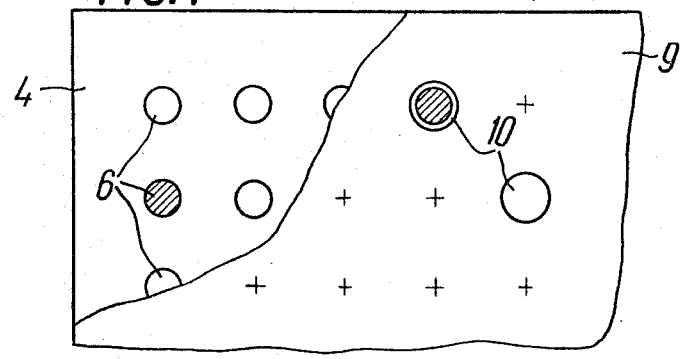
Figure 3:
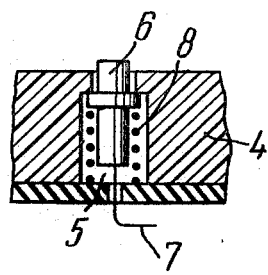

The invention will be better understood from the description of an embodiment given by way of example with reference to the accompanying drawings in which:

FIG. 1 shows the cross section of the encoder, such as for a teaching machine according to the invention, FIG. 2 shows a plan view of the encoder, according to the invention, with partial tear-outs (the contact bearing board is removed), FIG. 3 shows a version of the moving contact design according to the invention.

The encoder device such as for a teaching machine comprises: a contact bearing board I (FIG. 1) made of an insulation material with metal contacts 2 which are fixed into it under pressure in a strict geometrical arrangement, e.g., in rows, the contacts being isolated from one another and connected by electrical leads 3 to an external apparatus such as a logical unit (not shown in the drawing) of the machine; an encoder board 4 (FIG. 2) made of an insulation material and provided with sockets 5 (FIG. 3) arranged in rows the number of which is equal to that of the contacts 2 of the contact bearing board I. The sockets 5 house metal contacts 6 which can shift in the vertical direction and which are electrically connected with wire leads 7 to a further external apparatus such as a comparator (not shown in the drawing) of a teaching machine. All of the contacts 6 in the sockets 5 is spring-loaded by a spring 8 and are thus urged upwardly as shown. The number of the contacts 6 and the sockets 5 of the board 4 is equal to that of the contacts 2 belonging to the board I, and all these elements have similar geometrical arrangements and are strictly coaxial.

Placed between the contact bearing board (FIG. 1) and the encoder board 4 is an expendable punched card 9 serving as a program carrier and made of a sheet of standard hard paper provided with holes 10 at selected locations as shown. The function of the punched card is to isolate the contacts 2 of the upper contact bearing board from the contacts 6 of the lower encoder board except for those contacts that are coaxial with a given hole 10.

The encoder operates in the following way.

The encoder is programmed by means of placing the required punched card (program carrier) 9 between the upper I and the lower 4 boards. Then, the boards are tightly pressed against each other, and certain contacts 6 of the encoder board 4 are able, due to the action of their springs 8, to press against certain contacts 2 through respective holes 10 in the card 9. Hence, selective connections are made between the wire leads 3 and 7 so as to couple together in a selective manner the external apparatus connected to such leads. By inserting a new card 9 having different hole 10 locations, a new selective interconnection of the leads 3 and 7 is readily effected.

The proposed encoder does not require expensive materials to manufacture and is easy to be built. At the same time it considerably increases the performance efficiency of the teaching machine as a whole. Its handling requires no special knowledge or training and hence, the teaching machine can be reprogrammed by the student himself, which frees the operating staff from the functions of introducing the programmed material into the teaching machine.

We claim:

1. An encoding device for a teaching machine having a graphic answer input, said device being of the type wherein electrical interconnection between a plurality of leads is selected under the control of a punched card, said device comprising: a contact bearing board of insulation material having a first plurality of electrical contacts disposed thereon in a predetermined pattern with each contact having a different lead of a first set of leads connected thereto; an encoder-board of insulation material disposed therebelow and in substantial registry with said contact-bearing board and having a plurality of sockets therein arranged in said predetermined pattern, a second plurality of electrical contacts each of which is respectively disposed in one of said sockets and in coaxial relationship with a respective one of said first plurality of contacts, each said second plurality of contacts having a different lead of a second set of leads connected thereto; spring means disposed in said sockets for urging said second plurality of contacts toward said first plurality of contacts; and a replaceable card disposed between and in registry with said contact-bearing board and said encoder-board respectively, to insulate each of said contacts of said first plurality of contacts from each of said contacts of said second plurality of contacts, said card having predetermined holes disposed therethrough, whereby selective contacts of said second plurality of contacts are urged through said holes by said spring means to electrically engage with respective contacts of said first plurality of contacts so as to effect selective electrical interconnection between respective ones of said first and second sets of leads.

* * * * *